(12) United States Patent
Demosthenous et al.

(10) Patent No.: US 11,064,271 B2
(45) Date of Patent: Jul. 13, 2021

(54) SELECTIVE DELIVERY STATE CHANGE OF VALVE OF REMOTE METERING DEVICE

(71) Applicant: Mueller International, LLC, Atlanta, GA (US)

(72) Inventors: Georgios Demosthenous, Milton, MA (US); Jacqueline Duda Lemmerhirt, Framingham, MA (US); Christopher Paul LaCivita, Bridgewater, MA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 14/885,599

(22) Filed: Oct. 16, 2015

(65) Prior Publication Data
US 2017/0111712 A1   Apr. 20, 2017

(51) Int. Cl.
*H04Q 9/00* (2006.01)

(52) U.S. Cl.
CPC .......... *H04Q 9/00* (2013.01); *H04Q 2209/40* (2013.01); *H04Q 2209/43* (2013.01); *H04Q 2209/60* (2013.01)

(58) Field of Classification Search
CPC ... H04Q 9/00; H04Q 2209/40; H04Q 2209/60
See application file for complete search history.

(56) References Cited

U.S. PATENT DOCUMENTS

| | | | |
|---|---|---|---|
| 3,688,271 A | 8/1972 | Rouse | |
| 6,048,452 A * | 4/2000 | Shades | A47K 11/023 210/143 |
| 2004/0078350 A1 * | 4/2004 | Hattori | G01D 4/004 705/412 |
| 2004/0203375 A1 * | 10/2004 | Chen | H04Q 9/00 455/41.2 |
| 2006/0074601 A1 * | 4/2006 | Hoiness | H04Q 9/00 702/188 |
| 2007/0063867 A1 * | 3/2007 | Fuller | H04Q 9/00 340/870.02 |
| 2007/0222581 A1 * | 9/2007 | Hawkins | H04Q 9/00 340/539.1 |
| 2010/0318238 A1 | 12/2010 | Bryson et al. | |
| 2011/0074600 A1 | 3/2011 | Cornwall et al. | |
| 2011/0202293 A1 | 8/2011 | Kobraei et al. | |
| 2011/0284777 A1 | 11/2011 | Pitchford et al. | |

(Continued)

FOREIGN PATENT DOCUMENTS

EP    2107341    10/2009

OTHER PUBLICATIONS

Demosthenous, Georgios; International Search Report and Written Opinion for Application No. PCT/US16/12839, filed Jan. 11, 2016, dated Mar. 29, 2016, 10 pgs.

(Continued)

*Primary Examiner* — James J Yang
(74) *Attorney, Agent, or Firm* — Taylor English Duma LLP

(57) ABSTRACT

Examples of selective state change of a remote metering device are disclosed. In one example implementation according to aspects of the present disclosure, a connection between a mobile communication system and a remote metering device is established. A command to selectively change a delivery state of a valve of the remote metering device is then sent by the mobile communication system.

20 Claims, 8 Drawing Sheets

(56) References Cited

U.S. PATENT DOCUMENTS

2012/0062390 A1    3/2012  Solomon
2013/0154793 A1*   6/2013  Jhang .................. H04Q 9/00
                                                          340/5.6

OTHER PUBLICATIONS

Demosthenous, Georgios; PCT Application entitled: Selective Delivery State Change of Valve of Remote Metering Device having serial No. PCT/US16/12839, filed Jan. 11, 2016, 38 pgs.
Demosthenous, Georgios; International Preliminary Repot on Patentability for Application No. PCT/US16/12839, filed Jan. 11, 2016, dated Apr. 26, 2018, 9 pgs.

* cited by examiner

US 11,064,271 B2

SELECTIVE DELIVERY STATE CHANGE OF VALVE OF REMOTE METERING DEVICE

BACKGROUND

A utility provider may install and maintain infrastructure to provide utility services to its customers. For example, a water utility provider may implement a utility distribution system to distribute water to its customers. Metering devices may be utilized by the utility provider to determine consumption of the provided utility (e.g., water, electricity, gas, etc.).

BRIEF DESCRIPTION OF THE DRAWINGS

The following detailed description references the drawings, in which.

DETAILED DESCRIPTION

Figure 1:
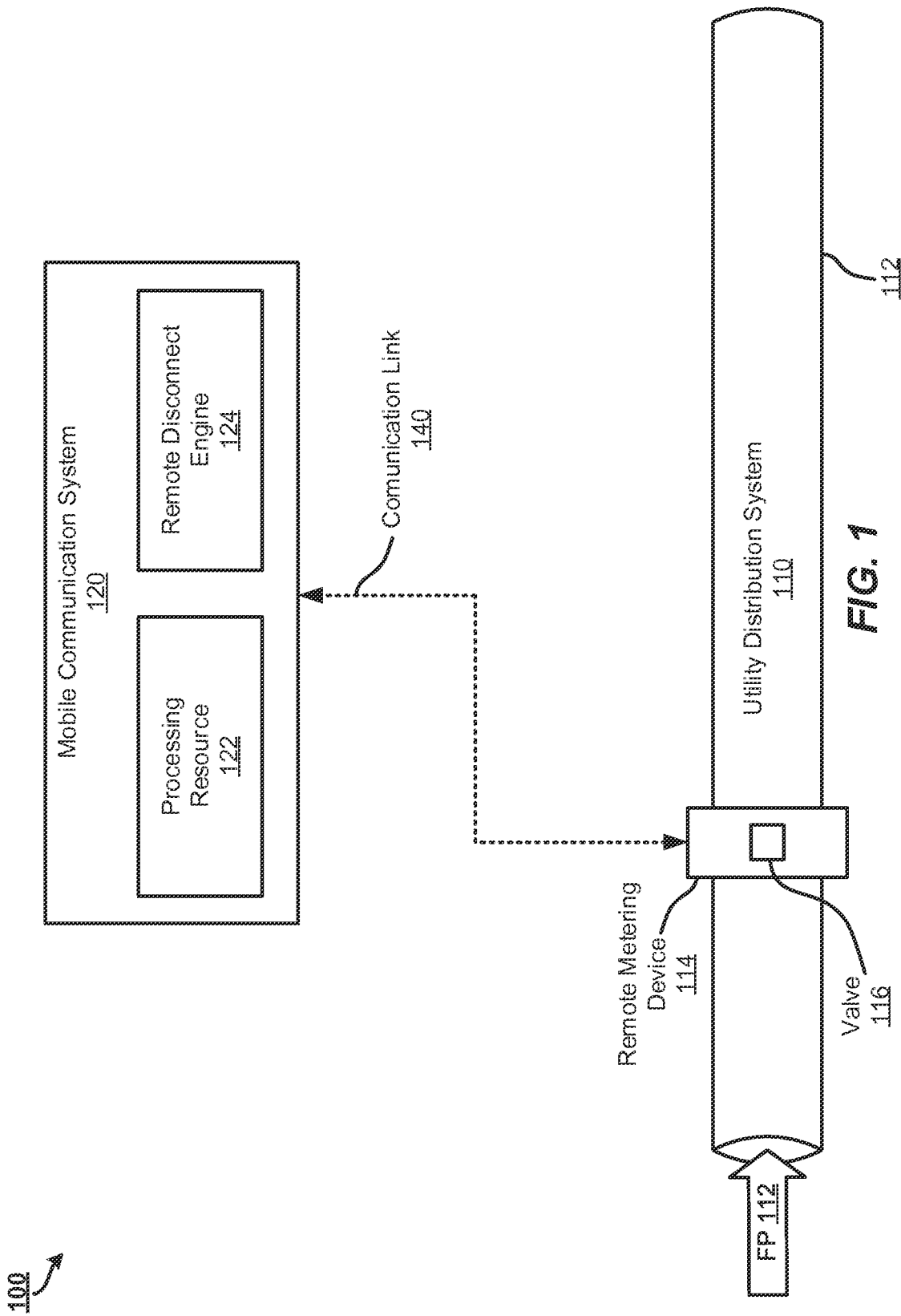
FIG. 1 illustrates a diagram of an environment to selectively change the delivery state of a valve of a remote metering device within a utility distribution system according to examples of the present disclosure.

A utility provider may utilize a utility distribution system to distribute utilities such as water, oil, electricity, or gas to its customers. To provide the utility to its customers effectively, the utility provider may desire to monitor the efficiency and integrity of the utility distribution system and to control certain aspects of the utility distribution system. For example a water utility provider may desire to selectively enable and disable delivery of water at a customer location. When a customer disconnects its service or fails to pay for previous service, the water utility provider may desire to disable delivery of water at the customer location. Conversely, the water utility provider may desire to enable delivery of water at the customer location when a service is initiated by a customer or a delinquent customer becomes current on its bill.

In some situations, metering devices with valves may be utilized to control the flow of a utility such as water to a customer. The valve may be of any suitable type. For example, the valve may comprise a butterfly valve, a solenoid valve, a ball valve, a gate valve, among others. These metering devices may be manually enabled and disabled (i.e., turned on and turned off) such as by a servicer. In other situations, the utility provider may implement metering devices that are part of a communication system such as automated meter reading (AMR) and/or automated meter infrastructure (AMI) systems. Although these systems may provide for remote control of the metering devices, such control occurs through the infrastructure of the AMR and/or AMI system and cannot be implemented without the costly AMR and/or AMI system. In some aspects of the present disclosure, the valve may enable and disable the flow of electricity. In this way, the valve may represent a circuit breaker, switch, etc.

Various implementations are described below by referring to several examples of selectively changing the delivery state of a valve of a remote metering device within a utility distribution system. In one example implementation according to aspects of the present disclosure, a connection between a mobile communication device and a remote metering device is established. A command to selectively change a delivery state of the remote metering device is then sent by the mobile communication device. Other example implementations and variations are disclosed herein.

The present disclosure enables metering device to be turned off and turned on (e.g., selectively changed between delivery states such as an off delivery state, a trickle delivery state, and an on delivery state) from the mobile communication device. Since the metering device is remote from the mobile communication device, servicer safety is improved because an employee need not be physically located at the metering device to change the delivery state. The servicer therefore may be relieved from experiencing dangerous or otherwise undesirable conditions such as dogs, angry customers, unsafe property conditions, inaccessible properties, and the like. Moreover, customer service is improved because the delivery state may be changed remotely, thereby reducing service time. Operational efficiency may also be improved by enabling a servicer to service more metering devices in a given period than may otherwise be possible. The present techniques do not rely on existing automated meter reading (AMR) and/or automated meter infrastructure (AMI) systems and therefore may be implemented without such systems, reducing costs to the utility providers. However, the present techniques may be implemented in conjunction with existing AMR and/or AMI systems. These and other advantages will be apparent from the description that follows.

Figure 2:
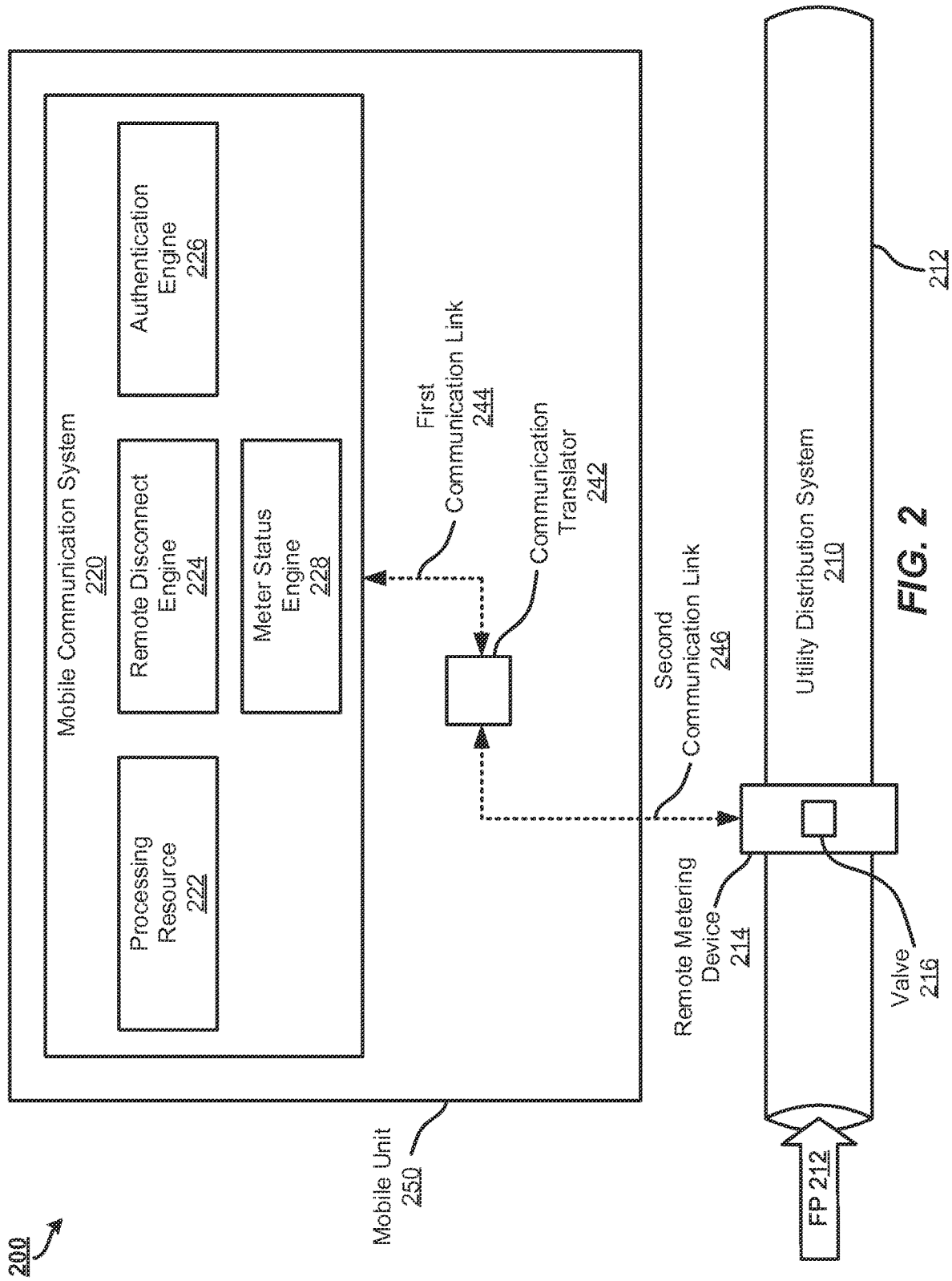
FIG. 2 illustrates a diagram of an environment to selectively change the delivery state of a valve of a remote metering device within a utility distribution system according to examples of the present disclosure.
Figure 3:
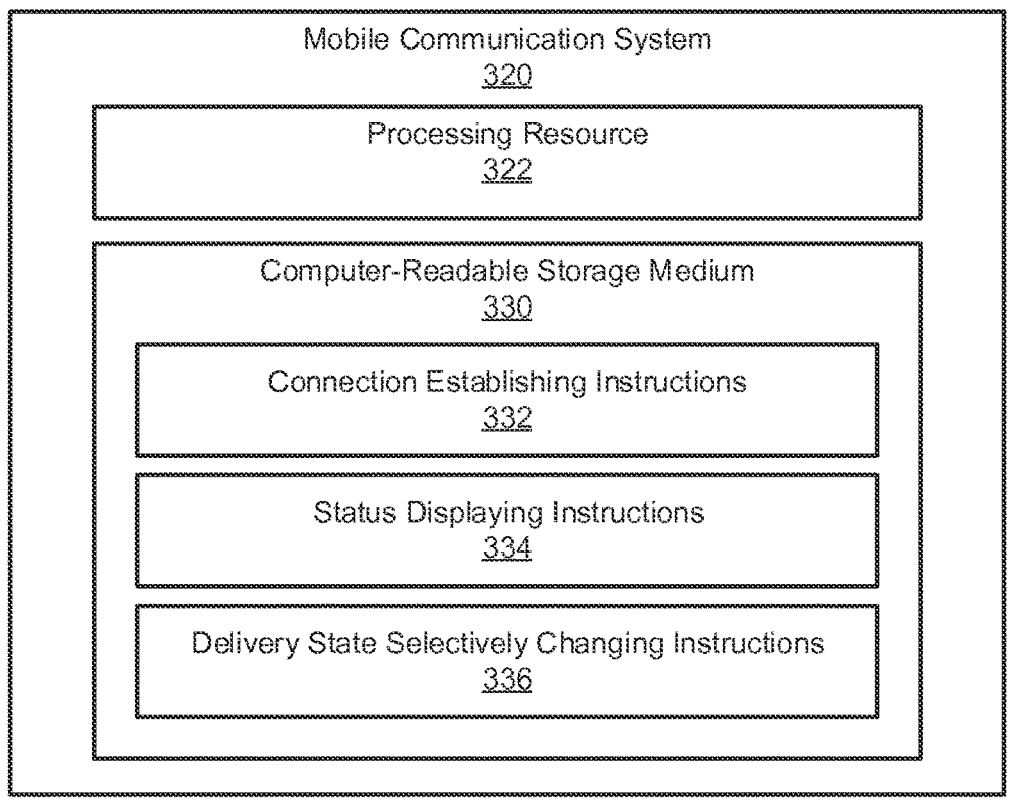
FIG. 3 illustrates a mobile communication system including a computer-readable storage medium storing instructions to selectively change the delivery state of a valve of a remote metering device within a utility distribution system according to examples of the present disclosure.

FIGS. 1-3 include particular components, modules, instructions, engines, etc. according to various examples as described herein. In different implementations, more, fewer, and/or other components, modules, instructions, engines, arrangements of components/modules/instructions/engines, etc. may be used according to the teachings described herein. In addition, various components, modules, engines, etc. described herein may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these.

Generally, FIGS. 1-3 relate to components and modules of a mobile communication system, such as mobile communication system 120 of FIG. 1, mobile communication system 220 of FIG. 2, and mobile communication system 320 of FIG. 3. It should be understood that the mobile communication systems 120, 220, and 320 may include any appropriate type of computing system and/or computing device, including for example smartphones, tablets, desktops, laptops, workstations, servers, smart monitors, smart televisions, digital signage, scientific instruments, retail point of sale devices, video walls, imaging devices, peripherals, networking equipment, wearable computing devices, or the like.

FIG. 1 illustrates a diagram of an environment 100 to selectively change the delivery state of a valve 116 of a remote metering device 114 within a utility distribution system 110 according to examples of the present disclosure. As illustrated, the environment 100 includes a utility distribution system 110, which may further include a pipe 112. Although illustrated as the pipe 112, it should be understood that the utility distribution system 110 may be a plurality of pipes and other utility distribution system components connected together to form the utility distribution system 110, of which the pipe 112 is a portion.

Generally, utility distribution system 110 may be used to distribute utilities such as water to customers of a utility provider, for example. In aspects of the present disclosure, the utility distribution system 110 may represent any distribution system such as an irrigation system, municipal water system, a gas and/or oil system, and an electric system. In the context of irrigation, the present techniques may be utilized to control the flow of water for irrigation, for example. The utility distribution system 110 may also be used in transient areas, such as apartments, office buildings, etc. to enable utility distribution to be enabled and disabled conveniently. The utility distribution system 110 may include various and numerous components, such as pipes (e.g., pipe 112), hydrants, valves, couplers, corporation stops, and the like, as well as suitable combinations thereof. In examples, the utility distribution system 110 may be partially or wholly subterraneous, or portions of the utility distribution system 110 may be subterraneous, while other portions of the utility distribution system 110 may be non-subterraneous (i.e., above ground). For example, a pipe such as pipe 112 may be partially or wholly subterraneous while a device (e.g., a remote metering device 114, a hydrant, a valve, a testing device, etc.) connected to the pipe 112 may be partially or wholly non-subterraneous. In other examples, the pipe 112 may be partially subterraneous in that the pipe 112 has portions exposed, such as to connect certain devices (e.g., remote metering device 114, a hydrant, a valve, a testing device, etc.) to the pipe 112.

The remote metering device 114 monitors consumption data of a utility flowing through the utility distribution system 110, illustrated as utility path 112 within the utility distribution system 110. In examples, the remote metering device 114 is in utility communication with utility path 112 within the utility distribution system 110. As illustrated in FIG. 1, the remote metering device 114 is connected to the pipe 112 of the utility distribution system 110. In examples, the connection may be direct and/or indirect. More particularly, the remote metering device 114 may be connected directly to the pipe 112, such as through a hole drilled into the wall of the pipe 112 or via a coupling member (not shown) of the pipe 112, thereby causing the remote metering device 114 to be in utility communication with the flow path 112. In another example, the remote metering device 114 may be connected indirectly to the pipe 112, such as via another component in the utility distribution system 110 (e.g., a hydrant, a valve, a coupler, a corporation stop, etc.).

The remote metering device 114 may include a valve 116 that is selectively changeable to be in an on delivery state (open position), a trickle delivery state (a partially open position) or an off delivery state (closed position). In the on delivery state, the valve 116 enables the utility to travel through the utility distribution system 110 through the valve 116 such that the flow path 112 is uninterrupted. Conversely, in the off delivery state, the valve 116 prevents the utility from traveling through the utility distribution system 110. In this way, the flow path 112 is stopped, and no utility passes the valve 116. In the trickle delivery state, the valve enables flow control by being able to control the amount of flow through the valve between closed and open. The valve may be useful in providing and restricting service to a customer, for example. In such case, the valve 116 and the remote metering device 114 may be communicatively coupled such a command may be sent to the remote metering device 114 to selectively change the state of the valve 116 between the off delivery state and the on delivery state. The remote metering device 114 may also include an antenna (not shown) to wirelessly transmit and/or receive signals, commands, and/or data to and from other devices, including the mobile communication system 120 such as via the communication link 140.

In examples, the valve 114 includes a solenoid. The solenoid is configured to change the valve 114 from the on delivery state to the off delivery state upon receiving a command to selectively change the delivery state of the valve 114 to the off delivery state and to change the valve 114 from the off delivery state to the on delivery state upon receiving a command to selectively change the delivery state of the valve 114 to the on delivery state.

The dotted lines of FIG. 1 illustrate communicative links between the remote metering device 114 and the mobile communication system 120, including communication link 140. These links generally represent a network or networks that may include hardware components and computers interconnected by communications channels that enable sharing of resources and information.

The mobile communication system 120 may include a processing resource 122 that represents generally any suitable type or form of processing unit or units capable of processing data or interpreting and executing instructions. The processing resource 122 may be one or more central processing units (CPUs), microprocessors, and/or other hardware devices suitable for retrieval and execution of instructions. The instructions may be stored, for example, on a memory resource (not shown), such as computer-readable storage medium 330 of FIG. 3, which may include any electronic, magnetic, optical, or other physical storage device that store executable instructions. Thus, the memory resource may be, for example, random access memory (RAM), electrically-erasable programmable read-only memory (EPPROM), a storage drive, an optical disk, and any other suitable type of volatile or non-volatile memory that stores instructions to cause a programmable processor (e.g., the processing resource 122) to perform the techniques described herein. In examples, the memory resource includes a main memory, such as a RAM in which the instructions may be stored during runtime, and a secondary memory, such as a nonvolatile memory in which a copy of the instructions is stored.

Additionally, the mobile communication system 120 may include a remote disconnect engine 124 which is configured to send a command to selectively change the delivery state of the valve 116 of the remote metering device 114 between an off delivery state and an on delivery state. In examples, the engine(s) described herein may be a combination of hardware and programming. The programming may be processor executable instructions stored on a tangible memory, and the hardware may include processing resource 122 for executing those instructions. Thus a memory resource (not shown) can be said to store program instructions that when executed by the processing resource 122 implement the engines described herein. Other engines may also be utilized to include other features and functionality described in other examples herein.

Alternatively or additionally, the mobile communication system 120 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processing resources (or processing resources utilizing multiple processing cores) may be used, as appropriate, along with multiple memory resources and/or types of memory resources.

The remote disconnect engine 124 is configured to send a command to selectively change the delivery state of the valve 116 of the remote metering device 114 between an off delivery state and an on delivery state. In this way, the valve 116 may be changed from an off delivery state to an on delivery state, and/or from an on delivery state to an off delivery state. For example, a user of the mobile communication system 120 may select to change the valve 116 of the remote metering device 114 from an off delivery state to an on delivery state. The remote disconnect engine 124 generates a command to selectively change the delivery state of the valve 116 to an on delivery state and sends the command to the remote metering device 114 via the communication link 140.

In examples, the mobile communication system 120 may communicate with the remote metering device 114 over communication link 140 via Bluetooth®, radio frequency, cellular, or other suitable communication technique. Once the remote metering device 114 receives the command, the remote metering device 114 causes the valve 116 to change from the off delivery state to the on delivery state. The remote metering device 116, in examples, may send an acknowledgement command to the mobile communication system 120 via communication link 140, which may be displayed to the user via a display (not shown) of the mobile communication system 120. A similar technique may be applied so as to change the valve 116 from an on delivery state to an off delivery state.

Although not shown in FIG. 1, it should be appreciated that the mobile communication system 120 may include additional components. For example, the mobile communication system 120 may include a display. The display may be or include a monitor, a touchscreen, a projection device, and/or a touch/sensory display device. The display may display text, images, and other appropriate graphical content. The mobile communication system 120 may also include a network interface to enable the mobile communication system 120 to communicate via the communication link 140 with the remote metering device 114, with additional remote metering devices, with other mobile communication systems, and/or with other suitable devices. The mobile communication system 120 may also include any suitable input and/or output device, such as a mouse, keyboard, printer, external disk drive, touchscreen, microphone, or the like. The mobile communication system 120 may also include an antenna (not shown) to wirelessly transmit and/or receive signals, commands, and/or data to and from other devices, including the remote metering device 114 such as via the communication link 140.

FIG. 2 illustrates a diagram of an environment 200 to selectively change the delivery state of a valve 216 of a remote metering device 214 within a utility distribution system 210 according to examples of the present disclosure. As illustrated, the environment 200 includes a utility distribution system 210, which may further include a pipe 212. Although illustrated as the pipe 212, it should be understood that the utility distribution system 210 may be a plurality of pipes and other utility distribution system components connected together to form the utility distribution system 210, of which the pipe 212 is a portion.

Generally, utility distribution system 210 may be used to distribute utilities such as water to customers of a utility provider, for example. The utility distribution system 210 may include various and numerous components, such as pipes (e.g., pipe 212), hydrants, valves, couplers, corporation stops, and the like, as well as suitable combinations thereof. In examples, the utility distribution system 210 may be partially or wholly subterranean, or portions of the utility distribution system 210 may be subterranean, while other portions of the utility distribution system 210 may be non-subterranean (i.e., above ground). For example, a pipe such as pipe 212 may be partially or wholly subterranean while a device (e.g., a remote metering device 214, a hydrant, a valve, a testing device, etc.) connected to the pipe 212 may be partially or wholly non-subterranean. In other examples, the pipe 212 may be partially subterranean in that the pipe 212 has portions exposed, such as to connect certain devices (e.g., remote metering device 214, a hydrant, a valve, a testing device, etc.) to the pipe 212.

The remote metering device 214 monitors consumption data of a utility flowing through the utility distribution system 210, illustrated as utility path 212 within the utility distribution system 210. In examples, the remote metering device 214 is in utility communication with utility path 212 within the utility distribution system 110. As illustrated in FIG. 2, the remote metering device 214 is connected to the pipe 212 of the utility distribution system 210. In examples, the connection may be direct and/or indirect. More particularly, the remote metering device 114 may be connected directly to the pipe 212, such as through a hole drilled into the wall of the pipe 212 or via a coupling member (not shown) of the pipe 212, thereby causing the remote metering device 214 to be in utility communication with the flow path 212. In another example, the remote metering device 214 may be connected indirectly to the pipe 212, such as via another component in the utility distribution system 210 (e.g., a hydrant, a valve, a coupler, a corporation stop, etc.).

The remote metering device 214 may include a valve 216 that is selectively changeable to be in an on delivery state (open position) or an off delivery state (closed position). In the on delivery state, the valve 216 enables the utility to travel through the utility distribution system 210 through the valve 216 such that the flow path 212 is uninterrupted. Conversely, in the off delivery state, the valve 216 prevents the utility from traveling through the utility distribution system 210. In this way, the flow path 212 is stopped, and no utility passes the valve 216. The valve may be useful in providing and restricting service to a customer, for example.

The valve 216 may be integrated into the remote metering device 214 or the valve 216 may be a separate component from the remote metering device 214. In such case, the valve 216 and the remote metering device 214 may be communicatively coupled such a command may be sent to the remote metering device 214 to selectively change the state of the valve 216 between the off delivery state and the on delivery state. The remote metering device 214 may also include an antenna (not shown) to wirelessly transmit and/or receive signals, commands, and/or data to and from other devices, including the mobile communication system 220 and the communication translator 242 such as via the first communication link 244 and/or the second communication link 246.

In examples, the meter device 214 includes a solenoid. The solenoid is configured to change the valve 216 from the on delivery state to the off delivery state upon receiving a command to selectively change the delivery state of the valve 216 to the off delivery state and to change the valve 216 from the off delivery state to the on delivery state upon receiving a command to selectively change the delivery state of the valve 216 to the on delivery state. In examples, the valve 216 may include a trickle delivery state such that fluid may flow through the valve 216 at a rate less than when the valve 216 is in the on delivery state. In this way, there exists the ability to control the meter device 214 in an optimal condition. In examples, meter devices such as meter device 214 have a range in between which the meter devices are accurate. The trickle delivery state provides for optimizing the operating range of the meter device 214 between fully on (on delivery state), fully off (off delivery state), in between (trickle delivery state). For example, if an error exists (e.g., too much flow through the meter device 214 so that a percent error is too high when collecting data regarding consumption) it may be desirable to reduce the flow through the valve 216 using the trickle delivery state.

The dotted lines of FIG. 2 illustrate communicative links between and among the remote metering device 214, the communication translator 242, and the mobile communication system 220, including a first communication link 244 (between the communication translator and the mobile communication system 220) and a second communication link 246 (between the remote metering device 214 and the communication translator 242). These links generally represent a network or networks that may include hardware components and computers interconnected by communications channels that enable sharing of resources and information. The network may include one or more of a cable, wireless, fiber optic, or remote connection via a telecommunication link, an infrared link, a radio frequency link, a cellular link, a Bluetooth® link, or any other suitable connectors or systems that provide electronic communication. The network may include, at least in part, an intranet, the internet, or a combination of both. The network may also include intermediate proxies, routers, switches, load balancers, and the like. The paths followed by the network between the devices as depicted in FIG. 2 represent the logical communication links between the remote metering device 214, the communication translator 242, and the mobile communication system 220, not necessarily the physical paths or links between and among the devices.

The mobile communication system 220 may include a processing resource 222 that represents generally any suitable type or form of processing unit or units capable of processing data or interpreting and executing instructions. The processing resource 222 may be one or more central processing units (CPUs), microprocessors, and/or other hardware devices suitable for retrieval and execution of instructions. The instructions may be stored, for example, on a memory resource (not shown), such as computer-readable storage medium 330 of FIG. 3, which may include any electronic, magnetic, optical, or other physical storage device that store executable instructions. Thus, the memory resource may be, for example, random access memory (RAM), electrically-erasable programmable read-only memory (EPPROM), a storage drive, an optical disk, and any other suitable type of volatile or non-volatile memory that stores instructions to cause a programmable processor (e.g., the processing resource 222) to perform the techniques described herein. In examples, the memory resource includes a main memory, such as a RAM in which the instructions may be stored during runtime, and a secondary memory, such as a nonvolatile memory in which a copy of the instructions is stored.

Additionally, the mobile communication system 220 may include a remote disconnect engine 224, an authentication engine 226, and a meter status engine 228. In examples, the engine(s) described herein may be a combination of hardware and programming. The programming may be processor executable instructions stored on a tangible memory, and the hardware may include processing resource 222 for executing those instructions. Thus a memory resource (not shown) can be said to store program instructions that when executed by the processing resource 222 implement the engines described herein. Other engines may also be utilized to include other features and functionality described in other examples herein.

Alternatively or additionally, the mobile communication system 220 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processing resources (or processing resources utilizing multiple processing cores) may be used, as appropriate, along with multiple memory resources and/or types of memory resources.

The remote disconnect engine 224 is configured to send a command to selectively change the delivery state of the valve 216 of the remote metering device 214 between an off delivery state and an on delivery state. In this way, the valve 216 may be changed from an off delivery state to an on delivery state, and/or from an on delivery state to an off delivery state. For example, a user of the mobile communication system 220 may select to change the valve 216 of the remote metering device 214 from an off delivery state to an on delivery state. The remote disconnect engine 224 generates a command to selectively change the delivery state of the valve 216 to an on delivery state and sends the command to the remote metering device 214 via the communication translator 242.

The authentication engine 226 is configured to establish a connection between the mobile communication system 220 and the remote metering device 214 via the communication translator 242. The connection is established by the authentication engine 226 prior to sending the command to selectively change the delivery state of the remote metering device. The authentication engine 226 may utilize authentication credentials, such as an email address and password to authenticate a user to utilize the mobile communication system. The authentication engine 226 may then establish the connection between the mobile communication system 220 and the remote metering device 214 once the user is authorized. The connection may be established through the communication translator 242 such that a connection may be established between the mobile communication system 220 communication translator 242 via the first communication link 244 and between the communication translator 242 and the remote metering device 214 via the second communication like 246.

Figure 8:
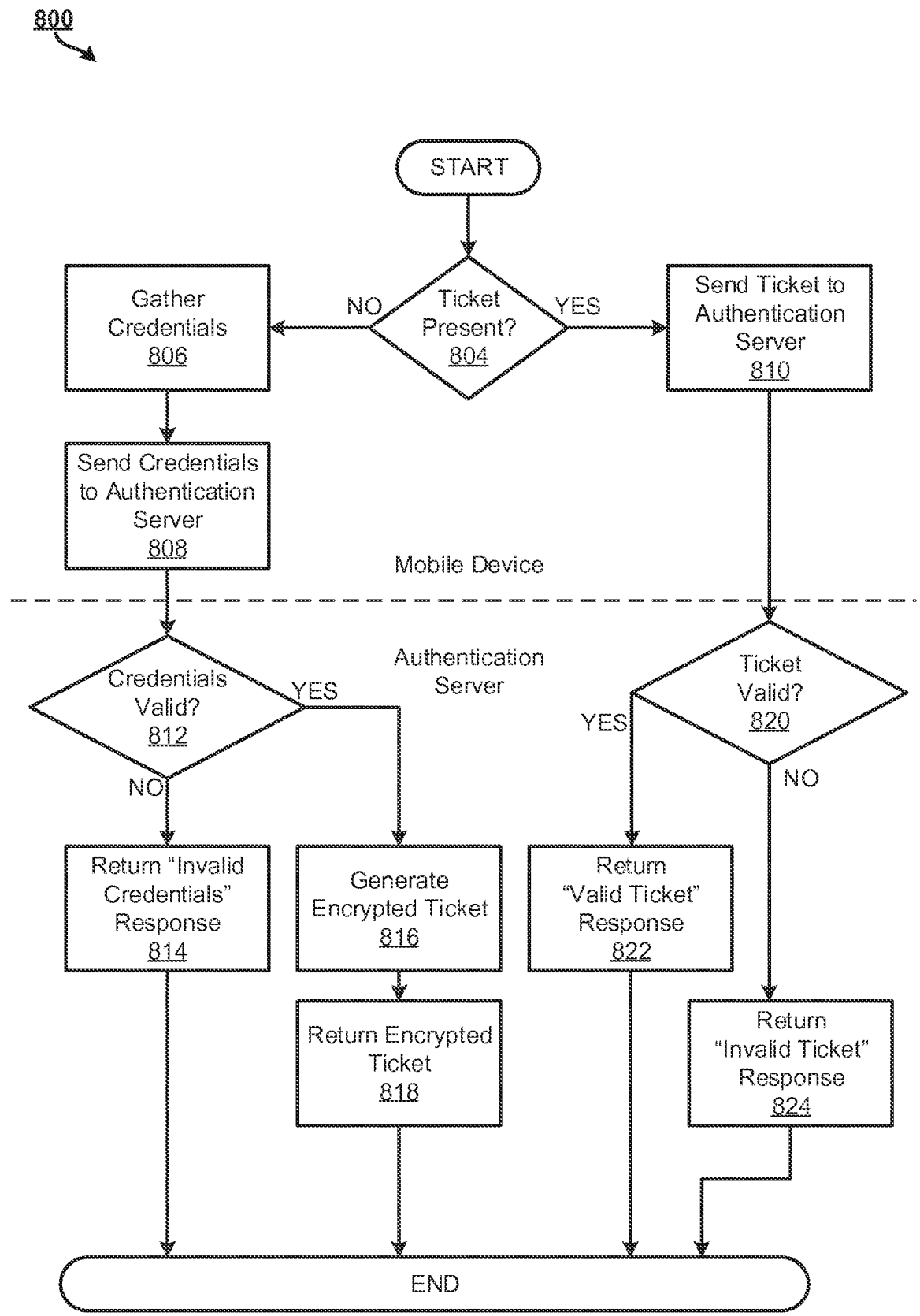
FIG. 8 illustrates a flow diagram of an authentication method for a mobile communication system according to examples of the present disclosure.

One example of an authentication technique is illustrated in FIG. 8 as an authentication method 800. Generally, users are pre-registered to use the mobile communication system 220 and are added by customer service to the administration application prior to the user accessing the mobile communication system 220. If the user has not successfully authenticated on the mobile communication system 220 within the past twelve hours (block 804), for example, the user enters their user name and password into the mobile communication system 220 (block 806), which calls out to an authentication server service via a secure connection, passing the username and password to the authentication server (block 808). Although the period is described as being 12 hours, other periods may be used as appropriate. The username and password are checked against hashed versions in the authentication database (block 812). If the username and password match, the service generates an encrypted ticket (block 816). This ticket contains a unique identifier for the user, the time the ticket was generated, the time until the ticket expires and a nonce, to increase entropy. This ticket is returned to and stored on the device for twelve hours (block 818). If the user has previously authenticated within the past twelve hours (block 804), for example, and then starts the application, the application calls out to a web service via a secure connection, passing the encrypted ticket from the previous authentication call (block 810). The ticket is then decrypted on the authentication server and compared with the user information in the database (block 820) as well as the time it was generated. If the ticket is valid and has not expired, the service returns a successful response (block 822) but returns an invalid response if invalid or expired (block 824). The application allows the user to continue without the need to provide their username and password.

The meter status engine 228 is configured to display a status of the remote metering device 214. The status may include the current delivery state the valve of the remote metering device (e.g., whether the valve is in an on delivery state or an off delivery state). In examples, the status also includes a meter radio identifier, a battery power level, a signal strength, and/or a version identifier, although additional and/or alternate status information may be provided In examples, the status of the remote metering device 214 is displayed before and/or after selectively changing the delivery state of the valve 216 of the remote metering device 214. In examples, meter status engine 228 may also provide consumption data (e.g., meter reads) when displaying the status of the remote metering device 214.

In examples, the mobile communication system 220 may communicate with the remote metering device 214 via the communication translator 242. The mobile communication system 220 transmits a command to selectively change the delivery state of the valve 216 over the first communication link 244 via one of Bluetooth®, radio frequency, cellular, or other suitable communication technique. The communication translator 242 receives the command from the mobile communication system 220 and then retransmits the command to the remote metering device 214 over the second communication link 246 via one of Bluetooth®, radio frequency, cellular, AMR, AMI, or other suitable communication technique.

In examples, the first communication link 244 and the second communication link 246 may utilize different communication techniques. For example, the first communication link 244 may utilize a Bluetooth® technique while the second communication link may utilize a radio frequency technique. In this example, the mobile communication system 220 may communicate with the communication translator 242 when the mobile communication system 220 is positioned in relatively close proximity to the communication translator 242, such as when the mobile communication system 220 is within mobile unit 250 (e.g., an automobile). The communication translator 242 may then retransmit the command via the second communication link 246 using the radio frequency technique to the remote metering device 214 that may be positioned in relatively farther proximity to the communication translator, 242, such as dozens of feet to several miles away from the communication translator 242. The communication translator 242 may be installed in and/or on mobile unit 250 to retransmit the command generated by the mobile communication system 220, such as when the mobile communication system 220 is positioned in or near the mobile unit 250. In other examples the first communication link 244 and the second communication link 246 may utilize the same communication technique.

Once the remote metering device 214 receives the command, the remote metering device 214 causes the valve 216 to change from the off delivery state to the on delivery state. The remote metering device 216, in examples, may send an acknowledgement command to the mobile communication system 220 through the communication translator 242 via the second communication link 246 and the first communication link 244. The acknowledgement may be displayed to the user via a display (not shown) of the mobile communication system 220. A similar technique may be applied so as to change the valve 216 from an on delivery state to an off delivery state.

Although not shown in FIG. 2, it should be appreciated that the mobile communication system 220 may include additional components. For example, the mobile communication system 220 may include a display. The display may be or include a monitor, a touchscreen, a projection device, and/or a touch/sensory display device. The display may display text, images, and other appropriate graphical content. The mobile communication system 220 may also include a network interface to enable the mobile communication system 220 to communicate via the first communication link 244 with the communication translator 242, with the remote metering device 214 directly, with additional remote metering devices, with other mobile communication systems, and/or with other suitable devices. The mobile communication system 220 may also include any suitable input and/or output device, such as a mouse, keyboard, printer, external disk drive, touchscreen, microphone, or the like. The mobile communication system 220 may also include an antenna (not shown) to wirelessly transmit and/or receive signals, commands, and/or data to and from other devices, including the communication translator 242 such as via the second communication link 246.

FIG. 3 illustrates a mobile communication system 330 including a computer-readable storage medium 330 storing instructions 332-336 to selectively change the delivery state of a valve of a remote metering device within a utility distribution system according to examples of the present disclosure. The computer-readable storage medium 330 is non-transitory in the sense that it does not encompass a transitory signal but instead is made up of one or more memory components configured to store the instructions 332-336. The computer-readable storage medium 330 may be representative of a memory resource and may store machine executable instructions 332-336, which are executable on a mobile communication system such as mobile communication system 120 of FIG. 1 and/or mobile communication system 220 of FIG. 2 as well as the mobile communication system 320 of FIG. 3 in conjunction with processing resource 322.

In the example shown in FIG. 3, the instructions 332-336 may include connection establishing instructions 332, status display instructions 334, and delivery state selectively changing instructions 336. The instructions 332-336 of the computer-readable storage medium 330 may be executable so as to perform the techniques described herein, including the functionality described regarding the method 400 of FIG. 4.

Figure 4:
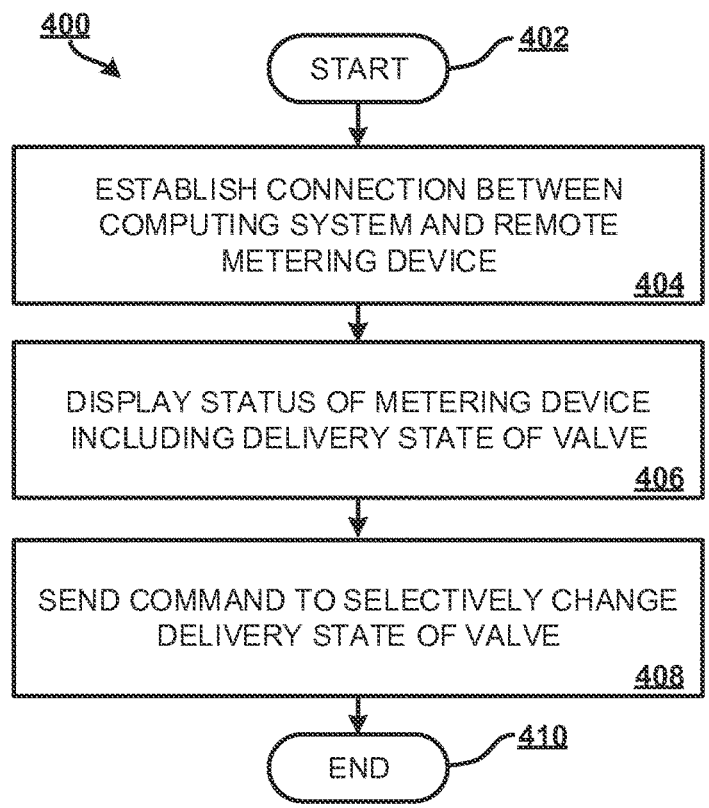
FIG. 4 illustrates a flow diagram of a method to selectively change the delivery state of a valve of a remote metering device within a utility distribution system according to examples of the present disclosure.

For example, the connection establishing instructions 332 may correspond to block 404 of FIG. 4. The status display instructions 334 may correspond to block 406 of FIG. 4. The delivery state selectively changing instructions 336 may correspond to block 408 of FIG. 4. The functionality of these instructions is described below with reference to the functional blocks of FIG. 4 but should not be construed as so limiting.

In particular, FIG. 4 illustrates a flow diagram of a method 400 to selectively change the delivery state of a valve of a remote metering device within a utility distribution system according to examples of the present disclosure. The method 400 may be executed by a mobile communication system or a mobile communication device such as mobile communication system 120 of FIG. 1, mobile communication system 220 of FIG. 2, and/or mobile communication system 320 of FIG. 3. The method 400 may also be stored as instructions on a non-transitory computer-readable storage medium such as computer-readable storage medium 330 of FIG. 3 that, when executed by a processing resource (e.g., processing resource 122 of FIG. 1, processing resource 222 of FIG. 2, and/or processing resource 322 of FIG. 3), cause the processing resource to perform the method 400.

At block 402, the method 400 begins and continues to block 404. At block 404, the method 400 includes establishing a connection between a mobile communication system and a remote metering device. For example, a connection is established between a mobile communication system (e.g., mobile communication system 120 of FIG. 1, mobile communication system 220 of FIG. 2, and/or mobile communication system 320 of FIG. 3) establishes and a remote metering device (e.g., remote metering device 114 of FIG. 1 and/or remote metering device 214 of FIG. 2). When establishing the connection, the method 400 may also comprise performing an on-demand read (i.e., performing a meter read function) to obtain consumption data. The method 400 continues to block 406.

At block 406, the method 400 includes displaying a status of the metering device including a delivery state of a valve of the metering device. For example, the mobile communication system displays a status of the metering device, the status including a delivery state of a valve (e.g., valve 116 of FIG. 1 and/or valve 216 of FIG. 2) of the metering device. The method 400 continues to block 408.

At block 408, the method 400 includes sending a command to selectively change the delivery state of the valve. For example, the mobile communication system sends a command to selectively change the delivery state of the valve of the remote metering device based on a received input. The method 400 continues to block 410 and terminates.

Additional processes also may be included. For example, the method 400 may include locating the remote metering device based on a remote metering device identifier. It should be understood that the processes depicted in FIG. 4 represent illustrations, and that other processes may be added or existing processes may be removed, modified, or rearranged without departing from the scope and spirit of the present disclosure.

Figure 5:
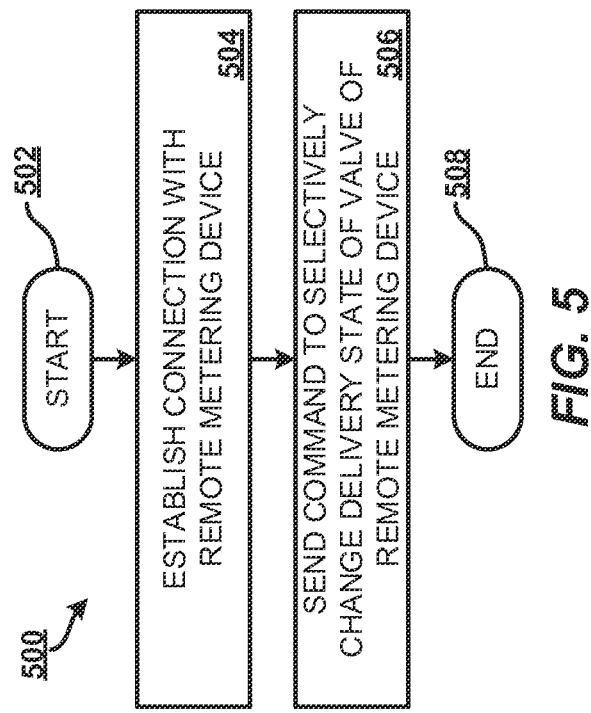
FIG. 5 illustrates a flow diagram of a method to selectively change the delivery state of a valve of a remote metering device within a utility distribution system according to examples of the present disclosure.

FIG. 5 illustrates a flow diagram of a method 500 to selectively change the delivery state of a valve of a remote metering device within a utility distribution system according to examples of the present disclosure. The method 500 may be executed by a mobile communication system or a mobile communication device such as mobile communication system 120 of FIG. 1, mobile communication system 220 of FIG. 2, and/or mobile communication system 320 of FIG. 3. The method 500 may also be stored as instructions on a non-transitory computer-readable storage medium such as computer-readable storage medium 330 of FIG. 3 that, when executed by a processing resource (e.g., processing resource 122 of FIG. 1, processing resource 222 of FIG. 2, and/or processing resource 322 of FIG. 3), cause the processing resource to perform the method 500.

At block 502, the method 500 begins and continues to block 504. At block 504, the method 500 includes establishing a connection with a remote metering device. For example, a connection is established between a mobile communication system (e.g., mobile communication system 120 of FIG. 1, mobile communication system 220 of FIG. 2, and/or mobile communication system 320 of FIG. 3) and a remote metering device (e.g., remote metering device 114 of FIG. 1 and/or remote metering device 214 of FIG. 2). In examples, establishing the connection may include the mobile communication system authenticating a user based on a user credential and connecting to the metering device based on a meter radio identifier. The connection between the mobile communication system and the remote metering device may utilize a communication translator to retransmit the command from the mobile communication system to the remote metering device. The method 500 continues to block 506.

At block 506, the method 500 includes sending a command to selectively change the delivery state of a valve of the remote metering device. For example, the mobile communication system sends a command to selectively change the delivery state of the valve of the remote metering device. The selection of whether to cause the valve to change to an on delivery state or an off delivery state may be based on a received user input. In examples, the delivery state is an off delivery state, and the command to selectively change the delivery state of the valve of the remote metering device causes the valve of the remote metering device to change from the off delivery state to an on delivery state. In other examples, the delivery state is an on delivery state, and the command to selectively change the delivery state of the valve of the remote metering device causes the remote metering device to change from the on delivery state to an off delivery state. The method 500 continues to block 508 and terminates.

Additional processes also may be included. For example, prior to sending the command to selectively change the delivery state of the valve of the remote metering device, the mobile communication system may receive a status of the metering device. The status may include the current delivery state the valve of the remote metering device (e.g., whether the valve is in an on delivery state or an off delivery state). In examples, the status also includes a meter radio identifier, a battery power level, a signal strength, and/or a version identifier. Additionally, subsequent to sending the command to selectively change the delivery state of the valve of the remote metering device, the mobile communication system, may receive the status of the metering device. It should be understood that the processes depicted in FIG. 5 represent illustrations, and that other processes may be added or existing processes may be removed, modified, or rearranged without departing from the scope and spirit of the present disclosure.

Figure 6:
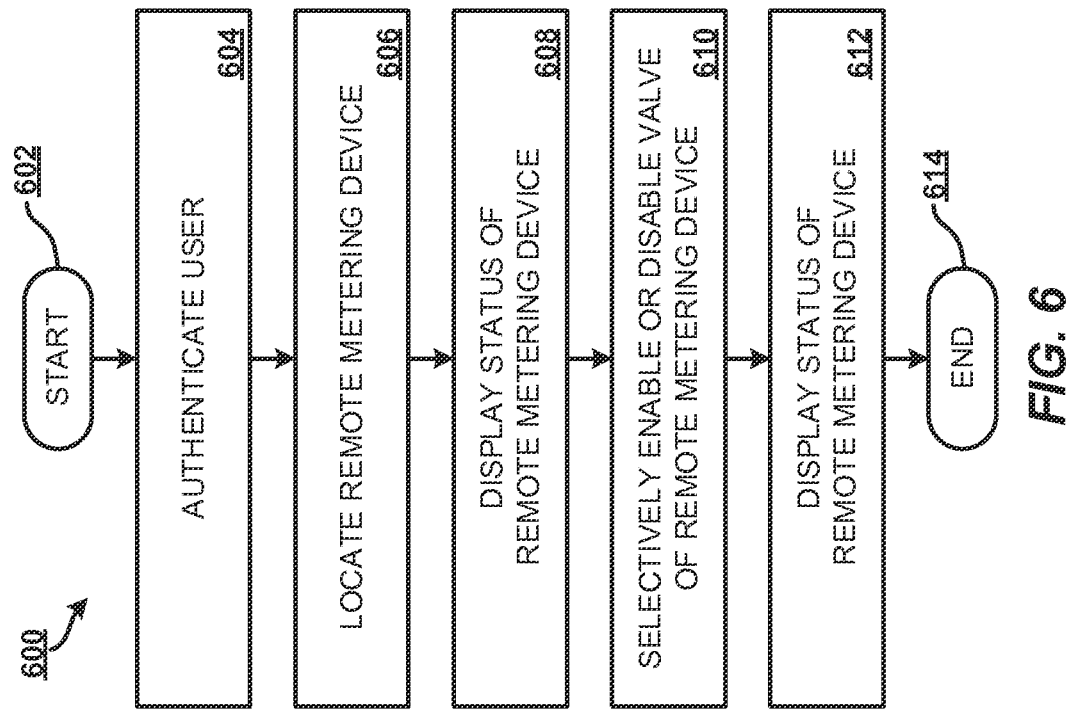
FIG. 6 illustrates a flow diagram of a method to selectively change the delivery state of a valve of a remote metering device within a utility distribution system according to examples of the present disclosure.

FIG. 6 illustrates a flow diagram of a method 600 to selectively change the delivery state of a valve of a remote metering device within a utility distribution system according to examples of the present disclosure. The method 600 may be executed by a mobile communication system or a mobile communication device such as mobile communication system 120 of FIG. 1, mobile communication system 220 of FIG. 2, and/or mobile communication system 320 of FIG. 3. The method 600 may also be stored as instructions on a non-transitory computer-readable storage medium such as computer-readable storage medium 330 of FIG. 3 that, when executed by a processing resource (e.g., processing resource 122 of FIG. 1, processing resource 222 of FIG. 2, and/or processing resource 322 of FIG. 3), cause the processing resource to perform the method 500.

Figure 7B:
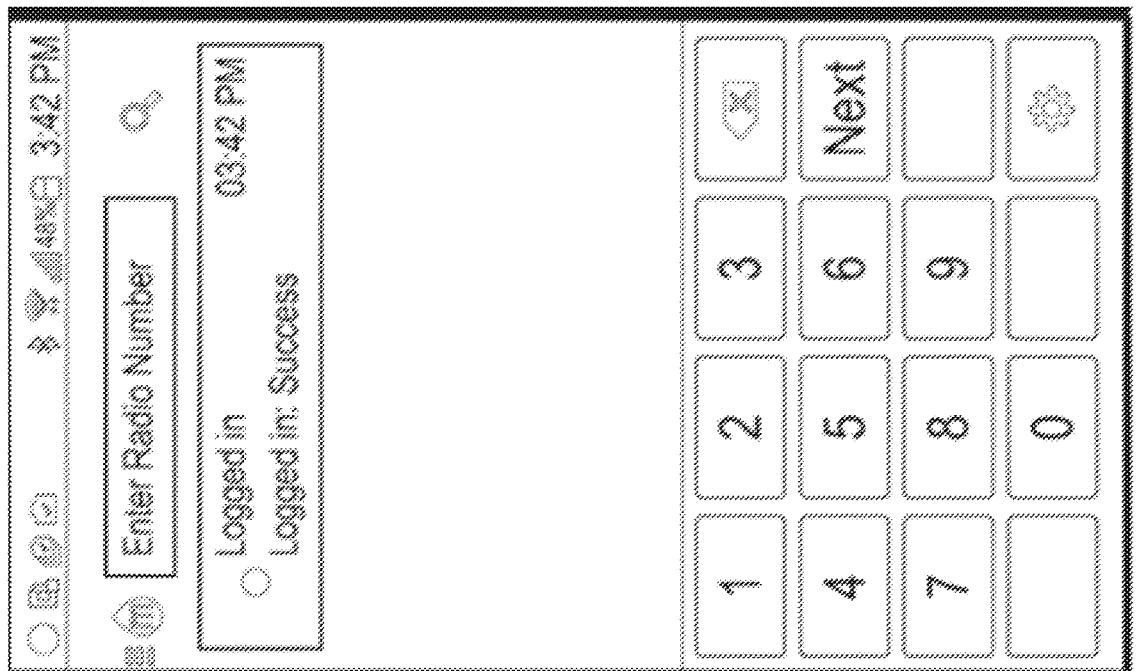
FIGS. 7A-7F illustrate screenshots of a mobile communication system to selectively change the delivery state of a valve of a remote metering device within a utility distribution system according to examples of the present disclosure.
Figure 7A:
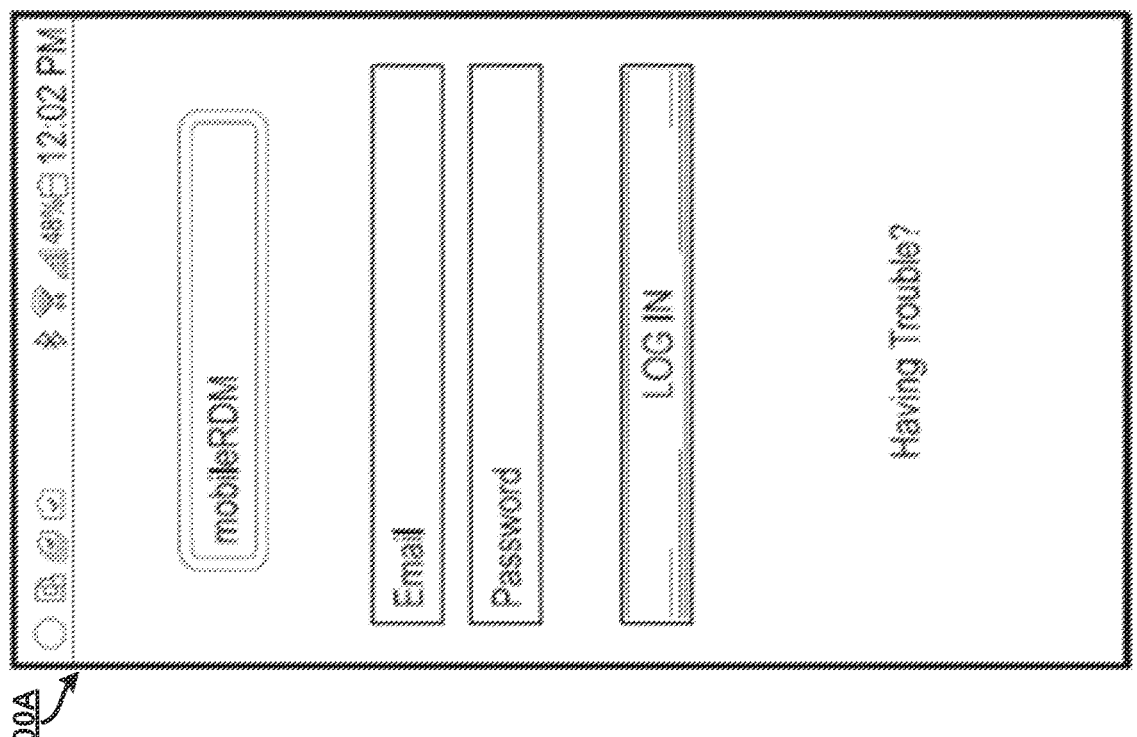
Figure 7D:
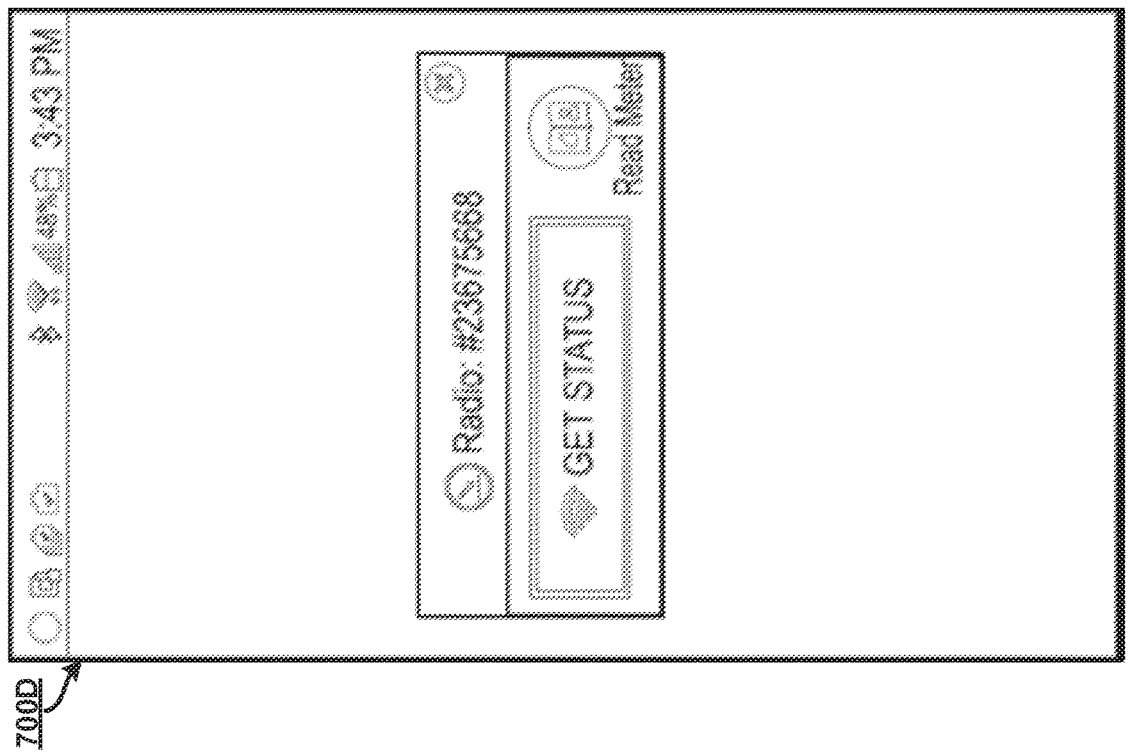
Figure 7C:
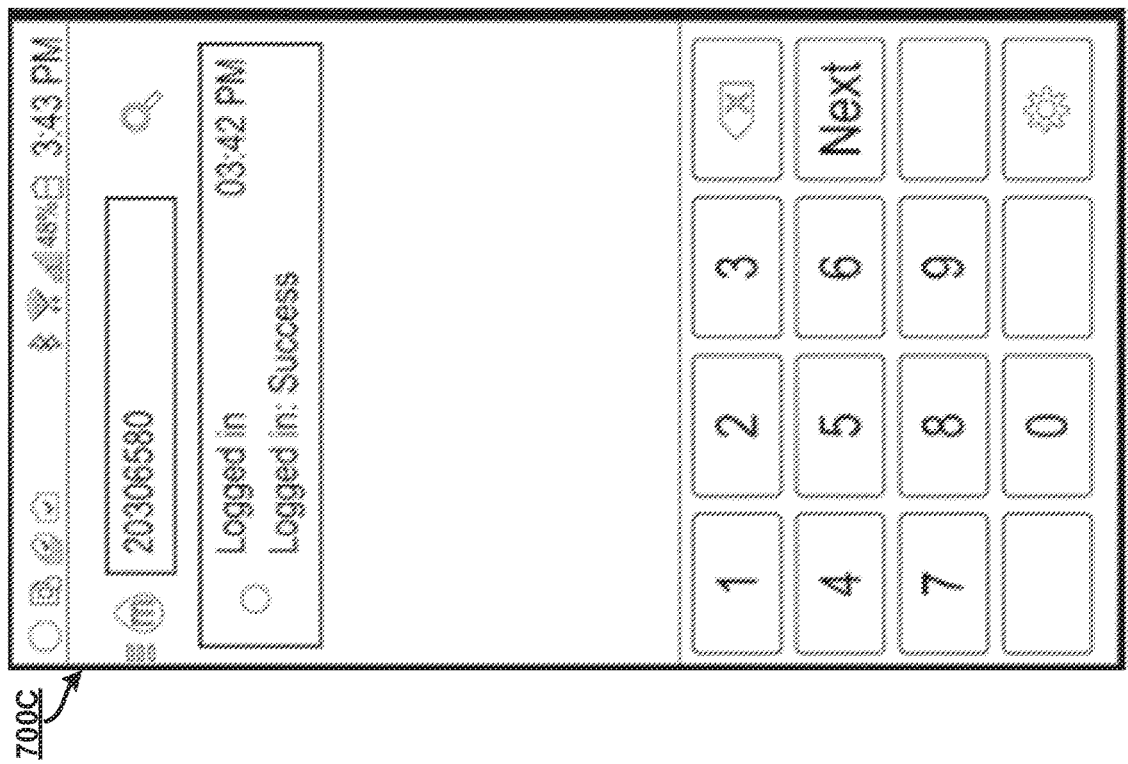
Figure 7F:
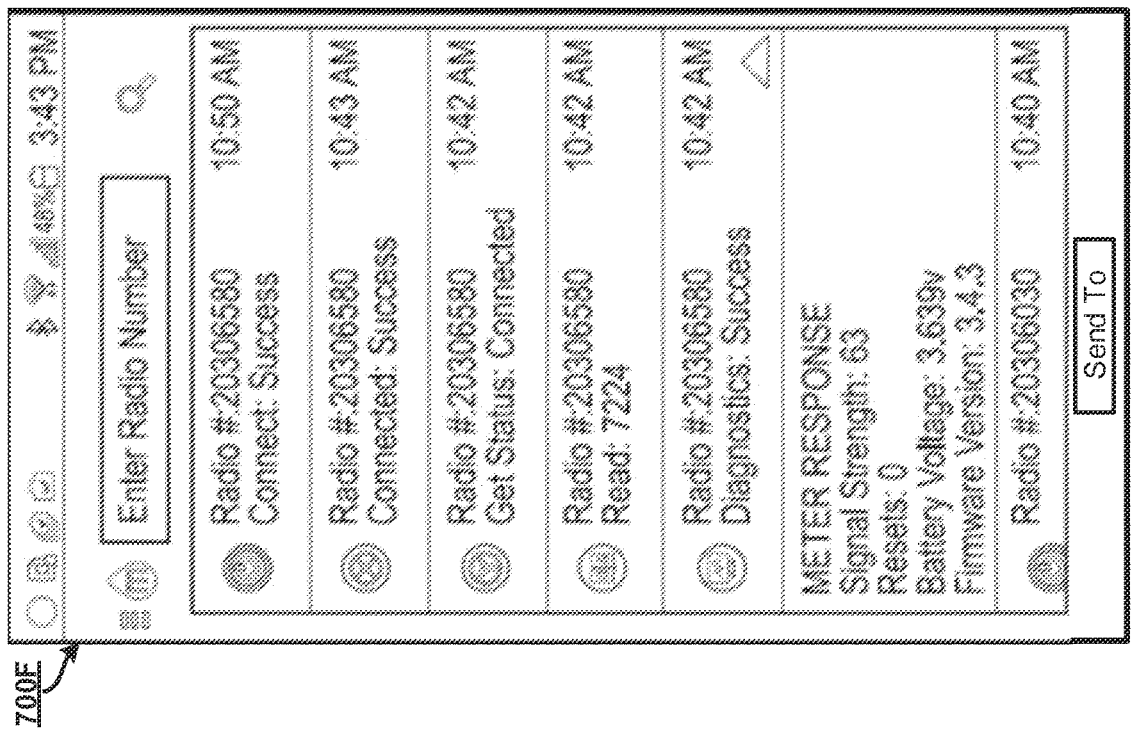
Figure 7E:
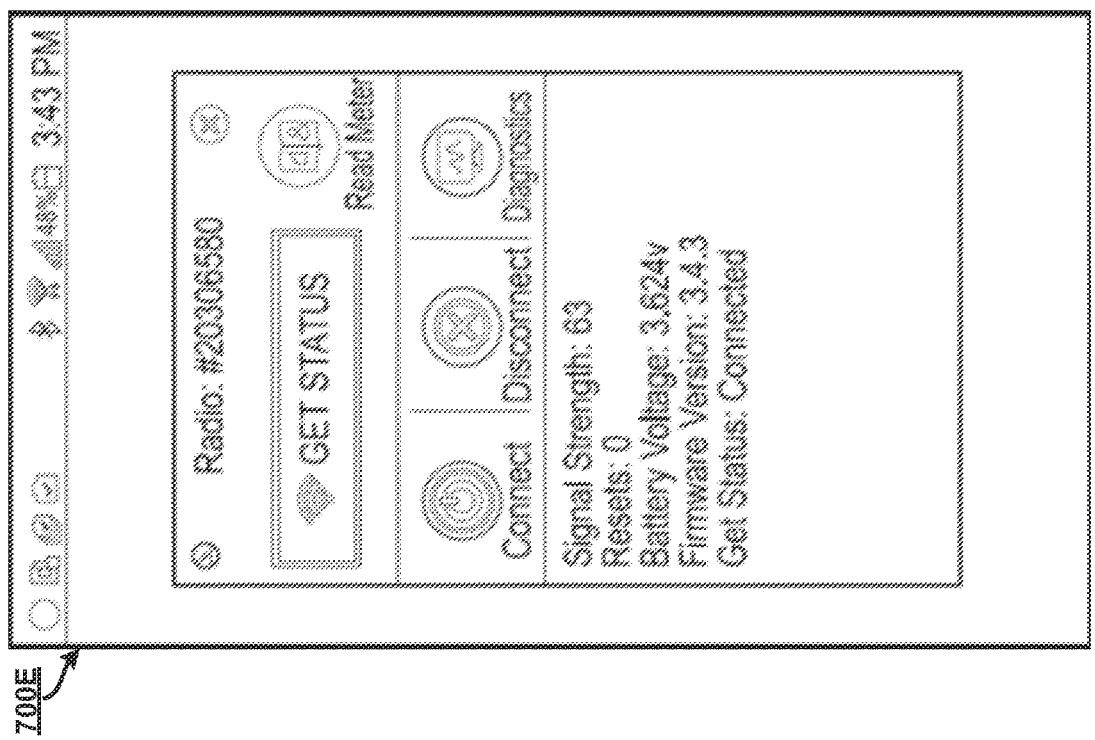

At block 602, the method 600 begins and continues to block 604. At block 604, the method 600 includes authenticating a user on the mobile communication system, such as illustrated in FIG. 7A described below. The method 600 continues to block 606, which includes locating a remote metering device 606 on the mobile communication system, such as illustrated in FIGS. 7B and 7C described below. Next, at block 608, the method 600 includes displaying the status of a remote metering device, such as illustrated in FIG. 7D described below. At block 610, the method 600 includes selectively enabling or disabling a valve of the remote metering device, such as illustrated in FIG. 7E described below. Next, the method 600 includes displaying the status of the remote metering device again at block 612, such as illustrated in FIG. 7F described below. The method 600 continues to block 614 and terminates.

Additional processes also may be included, and it should be understood that the processes depicted in FIG. 6 represent illustrations, and that other processes may be added or existing processes may be removed, modified, or rearranged without departing from the scope and spirit of the present disclosure.

FIGS. 7A-7F illustrate screenshots 700A-700F of a mobile communication system to selectively change the delivery state of a valve of a remote metering device within a utility distribution system according to examples of the present disclosure. In examples, a mobile communication system (e.g., mobile communication system 120 of FIGS. 1 and 2, mobile communication system 220 of FIG. 2, and/or mobile communication system 320 of FIG. 3) may generate graphical representations similar to or the same as screenshots 700A-700F, which may be displayed on a display of the mobile communication system.

Screen shot 700A of FIG. 7A illustrates an example of a login screen. A user may enter authentication credentials such as an email address and password to log into the mobile communication system. In this way, authorized users are enabled to use the mobile communication systems while unauthorized users are prohibited from such use. In examples, different users may be assigned different permissions, such as through the use of individual and/or group permission settings assigned by a system administrator.

When authentication fails, a message may be presented that the authentication credentials do not match an active account and/or are unrecognized or unauthorized. In examples, the mobile communication system may prompt the user to enter the authentication credentials again. In other examples, if a network connection is not detected, the user may be presented with a message that the connection is not available and that the user should try again after connecting to an appropriate network. When authentication is successful (e.g., once the user is logged into the mobile communication system), the mobile communication system displays a remote metering device identification screen.

For example, screen shot 700B of FIG. 7B illustrates an example of a remote metering device identification screen. At the remote metering device identification screen of screenshot 700B, a user is prompted to enter a remote metering device identifier, which may be entered using a numeric keyboard, for example. In other examples, metering device identifiers may be entered in other ways, such as by scanning a barcode or other identifier associated with a particular remote metering device. In yet other examples, metering devices may be automatically presented to the user if the remote metering devices are known or determined to be within a proximity of a certain distance of the mobile communication device. For example, a list of remote metering devices within 2 miles of the mobile communication device may be displayed to the user. In other examples, remote metering devices may be displayed to the user on a map. For example, a map may be displayed to the user on the mobile communication system, and remote metering devices may be indicated by an identifier (e.g., a "bubble," an "x," a "pin," or some other appropriate graphical representation). In examples, an option may exist on the map screen to display remote metering device information responsive to a user selecting a meter on the map. Such information may comprise location coordinates, address, pass SATA readings, etc. A desired remote metering device may be selected by the user, such as by tapping the desired identifier on a display of the mobile communication system.

Screenshot 700C of FIG. 7C illustrates an example of a remote metering device identification entry screen. The example indicates that a user has entered remote metering device identifier "20306580" using the numeric keypad. The mobile communication system attempts to connect to the appropriate remote metering device (e.g., remote metering device "20306580") and retrieve the status of the remote metering device (e.g., whether the metering device's valve is open or closed). If the connection is successful, the mobile communication system advances to the remote metering device action screen as illustrated in screen shot 700E of FIG. 7E. If the connection is not successful, the mobile communication system may display a failure reason and/or a remediation action to the user (e.g., remote metering device identifier not found, low battery, weak signal, etc.)

Screenshot 700D of FIG. 7D illustrates the remote metering device associated with remote metering device identifier "20306580" with options to "get status" and "read meter." The "get status" option causes screen shot 700E of FIG. 7E to be displayed. In particular, screen shot 700E illustrates a remote metering device action screen. In examples, the remote metering device action screen provides a user with various options including at least: enabling the remote metering device by selectively changing the delivery state of the remote metering device to an on delivery state; disabling the remote metering device by selectively changing the delivery state of the remote metering device to an off delivery state; obtain a status of the remote metering device;

obtain remote metering device diagnostic information; obtain remote metering device consumption data; review an action log (illustrated in screen shot 700F of FIG. 7F) for the current session; select a different remote metering device, such as by entering a different remote metering device identifier; obtain information about the meter, such as serial number, firmware version, etc.; and exiting the mobile communication system. As illustrated in FIG. 7, screen shot 700F may include a "send to" button to enable a user to send information from the mobile communication system to a printer, to a manager, and/or to send an email, text message, etc. These and other options may be presented to the user in various suitable combinations.

Although not illustrated, an administrative screen may be available to provide the user with setup and/or customization options. For example, the administrative screen may enable user on/off boarding such that users can be added, deleted, and/or deactivated. The administrative screen may also enable user password management to support a password reset function. The users and their associated passwords (as well as other information associated with the users such as user names, email addresses, physical addresses, etc.) may be maintained in a database.

In additional examples, an end session option may enable locking the mobile communication system and/or additional mobile communication systems. For example, if a mobile communication system is lost or stolen, a different mobile communication device may be used to lock the lost or stolen mobile communication system to prevent the selective change in delivery state of valves. An about or help screen may also be available to display information about the mobile communication system and/or help information.

In certain aspects of the present disclosure, a file may be sent to multiple mobile communication systems within a proximity of remote metering devices. The file causes the mobile communication systems to display remote metering devices to the user on a map. The users can then accept, decline, accept then decline, send back to an originator (e.g., a back office system) of whether to service the remote metering devices on the map. If accepted, the respective mobile communication system may map a route to the appropriate remote metering device and may load work orders, tasks, instructions, etc. relating to the appropriate remote metering device to the respective mobile communication system.

The screen shots 700A-700F may be mobile application interface screen shots delivered across a varying platforms, such as Android operating system, iOS operating system, MacOS operating system, Windows operating system, etc. or via a web browser interface.

It should be understood that, although the present disclosure is discussed in terms of water or utility meters, any suitable type of metering device may be utilized. For example, water, gas, and electric metering devices may all be implemented in suitable implementations.

It should also be understood that conditional language, such as, among others, "can," "could," "might," or "may," unless specifically stated otherwise, or otherwise understood within the context as used, is generally intended to convey that certain examples include, while other examples do not include, certain features, elements and/or steps. Thus, such conditional language is not generally intended to imply that features, elements, and/or steps are in any way required for one or more particular examples or that one or more particular examples necessarily include logic for deciding, with or without user input or prompting, whether these features, elements and/or steps are included or are to be performed in any particular example.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A system, comprising:
   a communication translator connected to a mobile unit;
   a remote metering device in communication with the communication translator, the remote metering device comprising a valve and configured to send a status of the remote metering device to the communication translator, the status comprising a delivery state of the valve, consumption data of the remote metering device, and a meter radio identifier; and
   a mobile communication system located in the mobile unit and in communication with the communication translator, the mobile communication system comprising
   a display configured to display a graphical user interface (GUI),
   a remote disconnect engine configured to allow generation, by the GUI, of a command to selectively change the delivery state of the valve, the delivery state comprising an off delivery state, a trickle delivery state, and an on delivery state,
   a meter status engine configured to display, via the GUI, the status of the remote metering device to a user of the mobile communication system, wherein the status of the remote metering device comprises a battery power level, a signal strength, and a version identifier, and
   an authentication engine configured to communicate with an authentication server via a secure connection in order to authenticate the user to use the mobile communication system, and to establish a connection between the mobile communication system and the remote metering device via the communication translator prior to sending the command to selectively change the delivery state of the remote metering device;
   wherein the mobile communication system is in communication with the communication translator via a first wireless communication link and the remote metering device is in communication with the communication translator via a second wireless communication link.

2. The system of claim 1, wherein the first wireless communication link comprises a Bluetooth radio communication link.

3. The system of claim 1, wherein the second wireless communication link comprises a radio frequency communication link.

4. The system of claim 1, wherein the first wireless communication link and the second wireless communication link are different protocols.

5. The system of claim 1, wherein establishing the connection between the mobile communication system and the remote metering device follows the authentication of the user to use the mobile communication system.

6. The system of claim 1, wherein the valve is configured to change from the off delivery state to the on delivery state upon receiving a command to selectively change the delivery state to the on delivery state.

7. The system of claim 1, wherein the remote metering device further comprises a solenoid configured to change the valve from the on delivery state to the off delivery state upon receiving a command to selectively change the delivery state of the valve to the off delivery state.

8. A method, comprising:
authenticating a user to use a mobile communication system by communicating with an authentication server service via a secure link;
establishing via a communication translator a connection between the mobile communication system and a remote metering device, the remote metering device comprising a valve, wherein the mobile communication system communicates with the communication translator via a first wireless communication link and the communication translator communicates with the remote metering device via a second wireless link;
receiving, by the mobile communication system, a status of the remote metering device, the status comprising a delivery state of the valve, consumption data of the remote metering device, and a meter radio identifier;
displaying, via a graphical user interface of the mobile communication system, the status of the remote metering device to the user of the mobile communication system, wherein the status of the remote metering device further comprises a battery power level, a signal strength, and a version identifier; and
generating, by the graphical user interface, a command to selectively change the delivery state of the valve of the remote metering device.

9. The method of claim 8, further comprising:
subsequent to sending the command to selectively change the delivery state of the valve of the remote metering device, receiving, by the mobile communication system, an updated status of the remote metering device, the updated status comprising the delivery state of the valve of the remote metering device.

10. The method of claim 8, wherein the delivery state is an off delivery state, and wherein the command to selectively change the delivery state of the valve of the remote metering device causes the valve of the remote metering device to change from the off delivery state to an on delivery state.

11. The method of claim 8, wherein the delivery state is an on delivery state, and wherein the command to selectively change the delivery state of the valve of the remote metering device causes the remote metering device to change from the on delivery state to an off delivery state.

12. The method of claim 8, wherein the remote metering device is a water metering device.

13. The method of claim 8, wherein the connection between the mobile communication system and the communication translator utilizes a first communication format and the connection between the communication translator and the remote metering device utilizes a second communication format.

14. A non-transitory computer-readable medium storing instructions that, when executed by a processing resource, cause the processing resource to:
authenticate a user to use a mobile communication system by communicating with an authentication server service via a secure link;
establish via a communication translator a connection between the mobile communication system and a remote metering device, the remote metering device comprising a valve, wherein the mobile communication system communicates with the communication translator via a first wireless communication link and the communication translator communicates with the remote metering device via a second wireless link;
receive a status of the remote metering device, the status comprising a delivery state of the valve, consumption data of the remote metering device, and a meter radio identifier;
display, via a graphical user interface of the mobile communication system, the status of the remote metering device to the user of the mobile communication system; and
generate, by the graphical user interface, a command to selectively change the delivery state of the valve of the remote metering device.

15. The non-transitory computer-readable medium of claim 14, further comprising instructions that cause the processing resource to:
locate the remote metering device based on a remote metering device identifier.

16. The system of claim 1, wherein the communication translator retransmits the command to the remote metering device over the second wireless communication link and the second wireless communication link is separate from an automatic meter reading (AMR) system in the remote metering device.

17. The system of claim 1, wherein the communication translator retransmits the command to the remote metering device over the second wireless communication link and the second wireless communication link is separate from an advanced metering infrastructure (AMI) system in the remote metering device.

18. The system of claim 1, wherein the mobile unit comprises an automobile and the mobile communication system comprises a smartphone.

19. The method of claim 8, wherein the mobile communication system comprises a smartphone.

20. The non-transitory computer-readable medium of claim 14, wherein the mobile communication system comprises a smartphone.

* * * * *